(12) United States Patent
Kakehashi

(10) Patent No.: US 6,959,414 B1
(45) Date of Patent: Oct. 25, 2005

(54) FORM EDITING METHOD AND APPARATUS, AND STORAGE MEDIUM STORING COMPUTER-READABLE PROGRAM

(75) Inventor: Takuya Kakehashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/493,083

(22) Filed: Jan. 28, 2000

(30) Foreign Application Priority Data

Jan. 29, 1999 (JP) .................................. 11-022947

(51) Int. Cl.[7] ............................................ G06F 15/00
(52) U.S. Cl. ........................ 715/507; 715/506; 715/508
(58) Field of Search ................................ 715/526–530, 715/505–506, 508, 507, 500, 511; 707/1, 707/511

(56) References Cited

U.S. PATENT DOCUMENTS

| 4,451,900 | A | * | 5/1984 | Mayer et al. | ............... 715/527 |
| 5,359,673 | A | * | 10/1994 | de La Beaujardiere | ..... 382/229 |
| 5,388,192 | A | * | 2/1995 | Ohsawa et al. | ............. 345/634 |
| 5,581,682 | A | * | 12/1996 | Anderson et al. | ........... 715/530 |
| 5,640,577 | A | * | 6/1997 | Scharmer | ..................... 715/507 |
| 5,704,029 | A | * | 12/1997 | Wright, Jr. | .................... 715/505 |
| 6,161,115 | A | * | 12/2000 | Ohanian | ..................... 715/530 |
| 6,195,665 | B1 | * | 2/2001 | Jarett | ......................... 715/500 |
| 6,272,506 | B1 | * | 8/2001 | Bell | ............................. 715/507 |

* cited by examiner

*Primary Examiner*—Sanjiv Shah
*Assistant Examiner*—Quoc A. Tran
(74) *Attorney, Agent, or Firm*—Fitzpatrick, Cella, Harper & Scinto

(57) ABSTRACT

Composite form data is constructed by one or a plurality of component form data. The attribute, print position, and the like of each field data defined in separately prepared field data are described in the composite form data. According to this invention, when a user is to edit the composite form data, the fields in the component form data contained in the composite form data are uniquely ordered to display a field list.

16 Claims, 20 Drawing Sheets

FIG. 13A

[COMPOSITE FORM SETTING FILE NAME]
C:Program Files¥Fcpro¥FORMWORK¥Test.fcx
[COMPOSITE FORM SETTING DIRECTORY NAME]
C:Program Files¥Fcpro¥FORMWORK
101— [NUMBER OF PAGES] 3

102— [PAGE NAME]        Nenkin01
103— [REPETITION COUNT] ARBITRARY
104— [PAGE TYPE]        STANDARD PAGE
105— [FILE NAME]
     C:Program Files¥Fcpro¥Samples¥Nenkin01.fcp 106 {
[PAGE NAME]        Nenkin02
[REPETITION COUNT] ARBITRARY
[PAGE TYPE]        STANDARD PAGE
[FILE NAME]
C:Program Files¥Fcpro¥Samples¥Nenkin02.fcp
C:Program Files¥Fcpro¥Samples¥Nenkin03.fcp
C:Program Files¥Fcpro¥Samples¥Nenkin04.fcp
}

107 {
[PAGE NAME]        Nenkin03
[REPETITION COUNT] ARBITRARY
[PAGE TYPE]        STANDARD PAGE
[FILE NAME]
C:Program Files¥Fcpro¥Samples¥Nenkin03.fcp
}

FIG. 13B

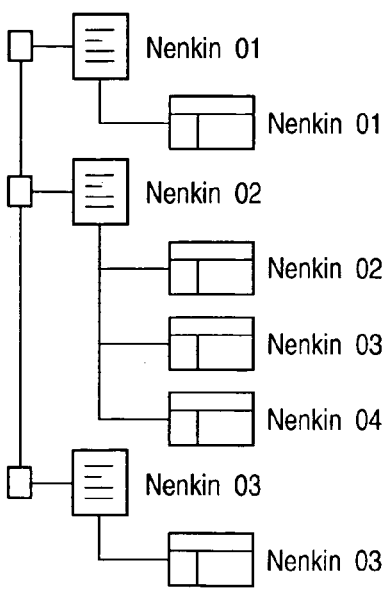

FORM EDITING METHOD AND APPARATUS, AND STORAGE MEDIUM STORING COMPUTER-READABLE PROGRAM

BACKGROUND OF THE INVENTION

The present invention relates to a form editing method, apparatus and a storage medium storing a computer-readable program for editing, e.g., form data to be overlaid on field data and the like.

Conventionally, documents have been frequently used as particulars in contracts and transactions. Ruled lines and graphic patterns are printed in advance in accordance with types of contracts in transactions in insurance companies and financial institutions. At the time of each contract, customer information is printed, e.g. using a printer, by a preprint scheme. In the financial circles having a large number of types of products such as life and nonlife insurances, the number of types of documents to be printed out and prepared in advance increases.

In recent years, a document creation system for creating a document by printing rules lines and a trade mark on a blank sheet together with data to be filled have been put into practice. This saves the cost required for printing and preparing documents in advance. Even if the forms of the documents are updated, old documents need not be wasted.

A document printing/browsing system uses a form data file describing the form (form information) of a document and a field data file describing customer data to be filled in the blanks of a document. The form information is prepared for each type of document and includes the following three elements. They are first, graphic information such as ruled lines, frames, and trade marks; second, fixed character information such as product names, a list of shop addresses, and provisions; and third, field information for defining an area in which data supplied from a data file is overlaid, and the output attribute of the area.

The form information is created by an editing application called a form editor. The form editor has a graphic drawing function, character string input function, and attribute setting function so as to allow the user to efficiently edit the above three elements.

The field data is a data string of numerical values and character strings in an order of fields defined by the form information. The field data is generally a text in which data are delimited by commas. The number of fields defined in sheets of a document is the number of data of one record and must be appropriately prepared. The fields defined in one document have serial numbers, which play a role as the field names for distinguishing the fields from each other.

The field data are filled in the fields from the beginning of a file in the order of serial numbers. When a document is made up of a plurality of pages, the serial numbers are assigned to all the fields of each page.

The documents must often be updated in accordance with product lines, social environment, and changes in laws. For example, even minor changes such as changes in addresses and trade marks require changes in form information files. Although cost required to update the files is lower than that of the preprint scheme, the number of form information files to be prepared increases depending on the industries having a variety of products. It is not easy to perform identical update jobs to all the form information files. In update jobs, operators may make mistakes and forget updating the files.

To eliminate the above drawback, there has been proposed a method of preparing a file called a component form and referring to this form from a form information file to construct one form. The component form file contains the three elements as in the form information file and can singly be used as a form information file. Form information using this component form is called composite form information. A software tool called a composite form editor for editing composite form information is also proposed.

The component form can be shared by a plurality of form information files. For example, when a component form describing a company badge is prepared, a document that should contain the company badge is referred to from the form information file containing the company badge. Even if the company badge is changed, only one component form is updated to allow changes in all the documents.

In the form information using a plurality of component forms (to be referred to as composite form information hereinafter), component forms have an ordinal relationship (order). The component forms have a registration or add order as their basic order. The order of the component forms may be changed. When a component form is deleted, a component form defined next takes the place of the deleted component form. No order changes in updating component forms.

The use of component forms facilitates document management, but care must be taken for creating field data. Data loaded from the start of a field data file in browsing and printing a document are filled in the fields in the order of component forms. The user must grasp the order of component forms and create a field data file so as to properly load the component forms.

In a conventional composite form editor, the user can only see the ordinal relationship between the component forms. This form editor does not have a function of displaying fields defined in each component. Resultingly, a plurality of form editors must be activated to display a list of fields set in a page in which a plurality of component forms are registered. The user loads the component forms to the plurality of activated form editors, arranges the editor windows in the order of component forms grasped by the user, and keeps displaying the list of fields contained in each component form. The conventional composite form editor does not provide a method of displaying a list defining the relationship between the order of component forms and the order of fields defined in the components. The user must prepare the list defining the relationship.

A heavy load is imposed on the user in creating field data. The field data are filled in the fields in accordance with the order of component forms related to the composite form information. In a list of fields of each component form, the serial numbers are assigned from the first field in each component form. For this reason, in order to know, from the start of a page, the ordinal number of a field of a component form located at the end of the list, the user must count fields up to the field of the component form located at the end of the list.

Assume that the user who traces the created field data wants to know the type and format of 50th data from the start of a given page. Since the given page is related to a plurality of component forms, the user must count the fields in each component form in the related order and trace the fields up to the 50th field. That is, the user must be conscious of the order of component forms while remembering the current field count and can finally find the target 50th field.

When the conventional composite form editor or form editor is used, field data and form information fields have a one-to-one correspondence from the start field of the start component form to the end field of the end component form of a composite form in output operation. The user, however, cannot know this correspondence.

Since the identifiers of the fields are displayed in the display contents of the component form, the user can easily find the corresponding field in the list of fields. It is, however, cumbersome and time-consuming to find the relationship between a specific field displayed in the list of fields and a corresponding field in the component form. This job may be difficult when a component form has a large number of fields.

SUMMARY OF THE INVENTION

The present invention has been made in consideration of the above conventional examples, and has as its object to provide a form editing method and apparatus capable of displaying, in order, a list of all fields of component forms registered in a composite form in units of pages, and providing a correct list of fields even if the definitions of the fields are changed upon editing the component forms.

It is another object of the present invention to provide a form editing method and apparatus capable of allowing a user to easily and correctly know, in a page, the order of field data supplied independently of forms.

It is still another object of the present invention to provide a form editing method and apparatus capable of easily finding and editing a field in a component field from an item in a list of fields.

In order to achieve the above object, the present invention has the following steps. That is, in a composite form editing method of editing a composite form, fields for synthesizing field data are defined in a component form, which definition includes an order. A page is made up of at least one component form. The composite form contains at least one page. The fields defined in a component form included in a page of interest are uniquely ordered in the page of interest on the basis of an order in each component form.

Preferably, the attributes of the fields uniquely ordered in the page of interest are displayed as a list uniquely corresponded to the unique order in the page of interest.

Preferably, when a component form included in the list is edited during display of the list, the fields in the page of interest are reordered on the basis of the edited component form, and the list is displayed again.

Preferably, when a desired field is selected from the list and an attribute of the selected field is designated, a component form having the selected field is displayed as an editing target.

Preferably, other component forms contained in the page of interest are displayed to be distinguishable from the component form containing the selected field.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 13A is a view showing the contents of an example of composite form data;

FIG. 13B is a view showing an example of composite form data tree;

DETAILED DESCRIPTION OF THE PREFERRED EMBODIMENTS

Preferred embodiments of the present invention will now be described in detail in accordance with the accompanying drawings.

Figure 8:
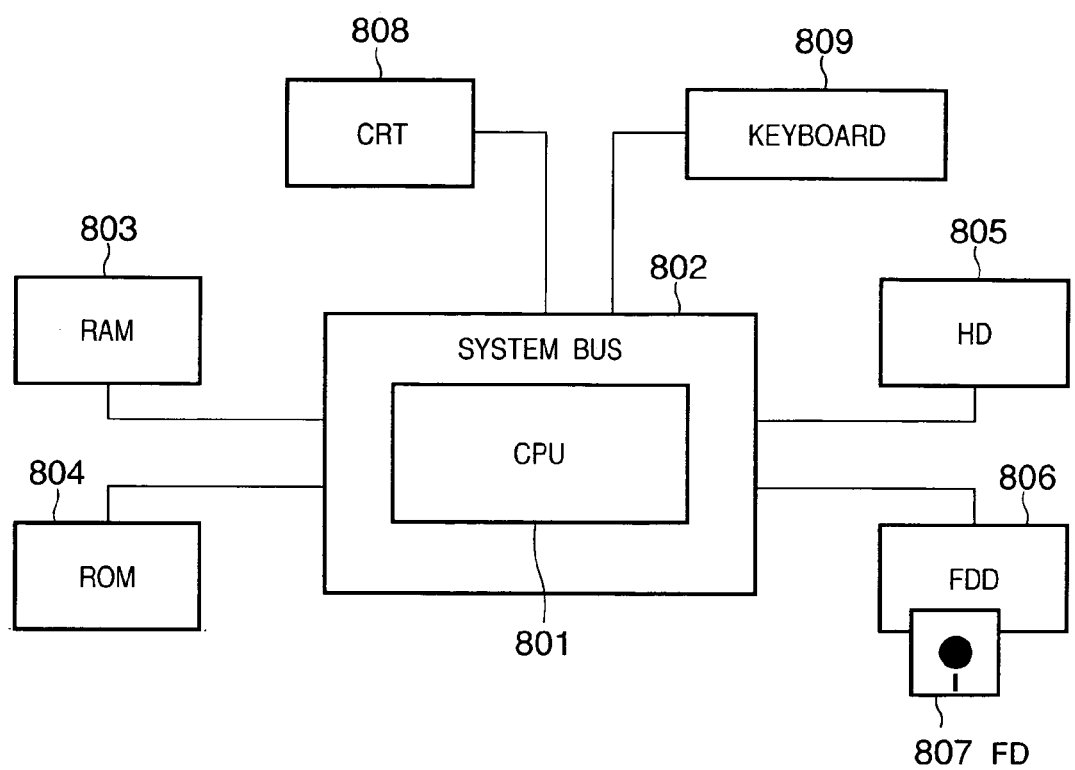
FIG. 8 is a block diagram showing the computer.

Prior to a description of a composite form editor according to the present invention, the overview of a form overlay process will be described below. FIG. 8 is a block diagram showing a computer system for executing the composite form editor.

Referring to FIG. 8, a CPU 801 controls to execute an application program, printer driver program, and OS stored in an HD (Hard Disk) 805 and temporarily store files and information required for executing the programs in a RAM 803. The RAM 803 serves as a main memory, work area, and the like for the CPU 801. A ROM 804 stores programs such as the basic I/O program and various data such as font and template data used in document processing.

An FDD 806 is a floppy disk drive, and the programs stored in the FD 807 via the FDD 806 can be loaded to the computer system.

Figure 10:
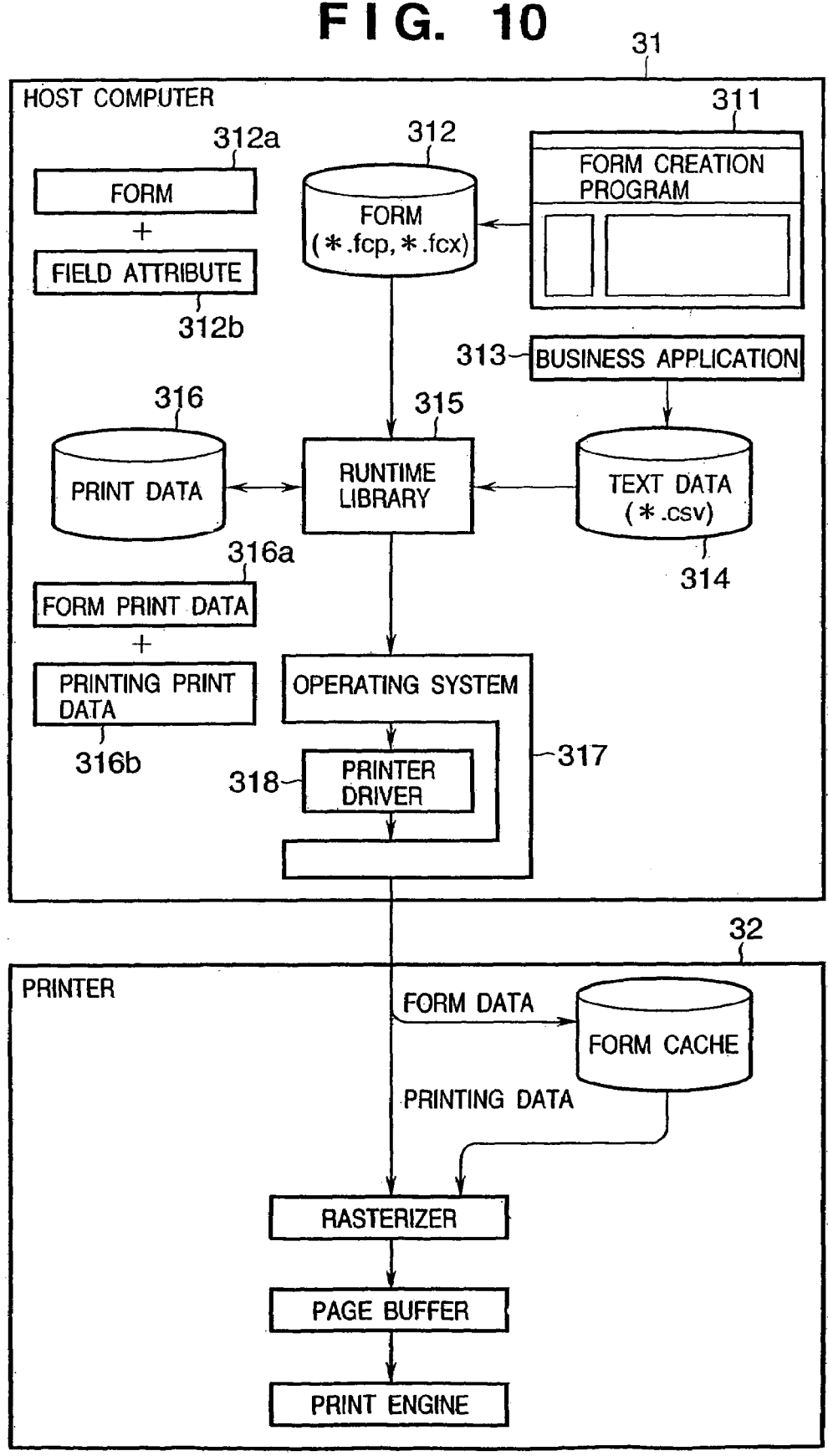
FIG. 10 is a schematic diagram showing a form overlay process.

FIG. 10 shows the overall flow of processing of overlay printing, including a form creation program. A form or composite form created by a form editing program (to also be referred to as a form editor hereinafter) 311 on a host computer 31 is stored in a form data storage 312 prepared in the HD 805 or the like. The forms are overlaid image data including graphic and character data or dot images. The composite form is a form constructed in units of pages, and each page is formed by overlaying forms serving as components. A special page of two-side or copy can be defined as a page. Each form (including a composite form) contains form data 312a representing a form itself and field attribute data 312b representing the position, font, and the like of printing data synthesized with a form. These data may be stored in one form data file. The composite form data may also be called FCX data, while form data that is not composite and serves a minimum unit may also be called FCP data. The CFX data may also be called image data, and the FCP data may also be called component image data.

A predetermined runtime library 315 converts these form data into form print data 316a interpretable by a printer 32 and stores the form print data 316a in a printer data storage 316 assured in the HD 805.

Printing data to be form-overlay-printed is generated by an appropriate business file 313 and stored in a text data storage 314. It suffices this data can have a format which can distinguish fields to be overlaid, for example, called a CSV format. The runtime library 315 also converts this printing data into printing print data 316b having a format interpretable by the printer 32. The converted data is stored in the print data storage 316.

An operating system 317 and printer driver 318 output the form print data and printing print data created as described above to the printer 32, and the printer 32 synthesizes and prints out these data.

Function of Composite Form Editor

The foregoing is the overview of form overlay printing. The form creation program (form editor) of this embodiment will be described with reference to the accompanying drawings.

Figure 11:
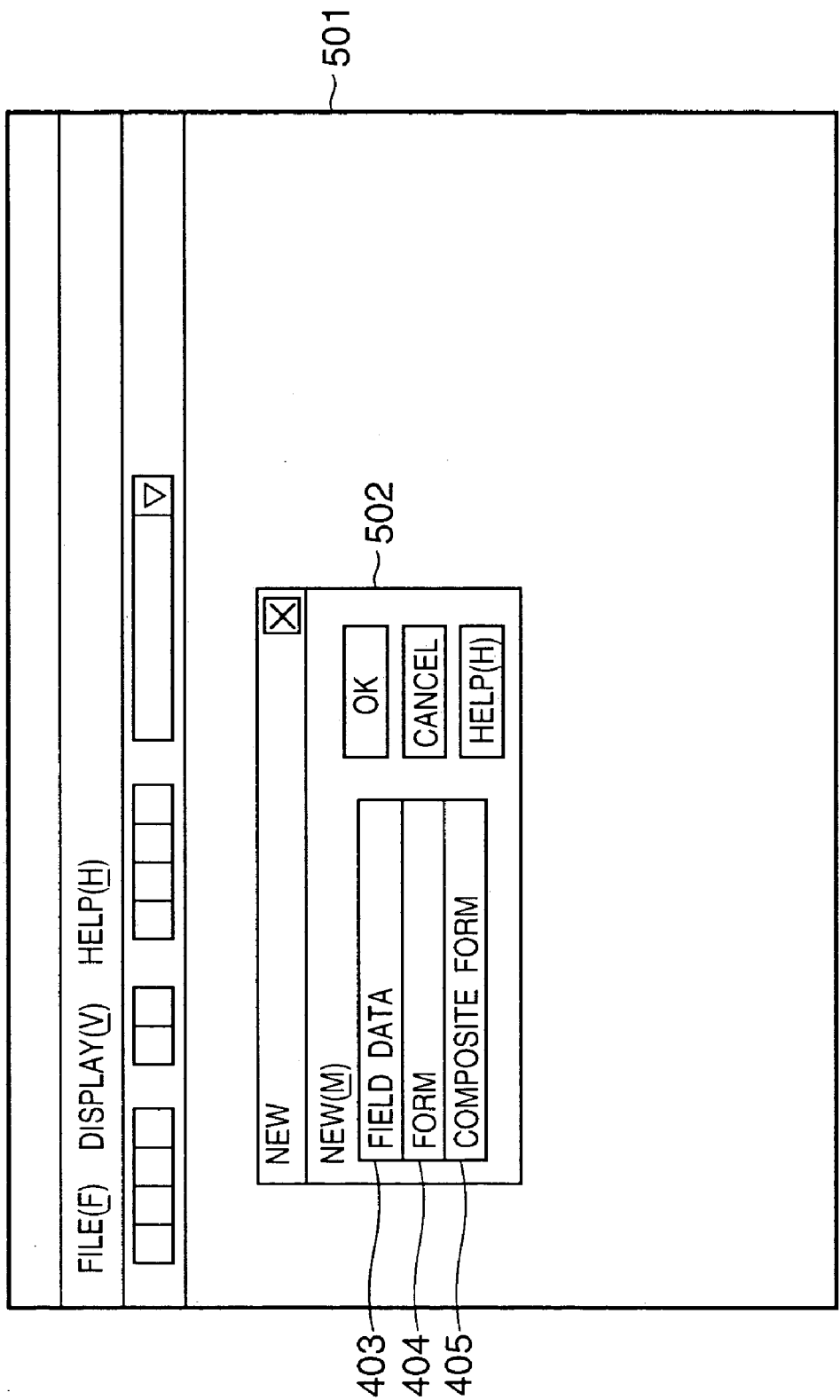
FIG. 11 is a view showing a form editor activation window as an example.

FIG. 11 is an example of a display window when a user designates creation of a new form after activating the form editor. A menu bar is displayed in the upper portion in a window 501. A window 502 for selecting an object to be newly created is displayed below the menu bar. The user can select one of field data, a form, and composite data. When the user selects a field data column 403, a sequence for editing the field attribute file 312b in FIG. 10 is activated. When the user selects a form column 404, a sequence for editing the component form data of one page is activated. The component form data can singly serve as the form data of one page.

Figure 12:
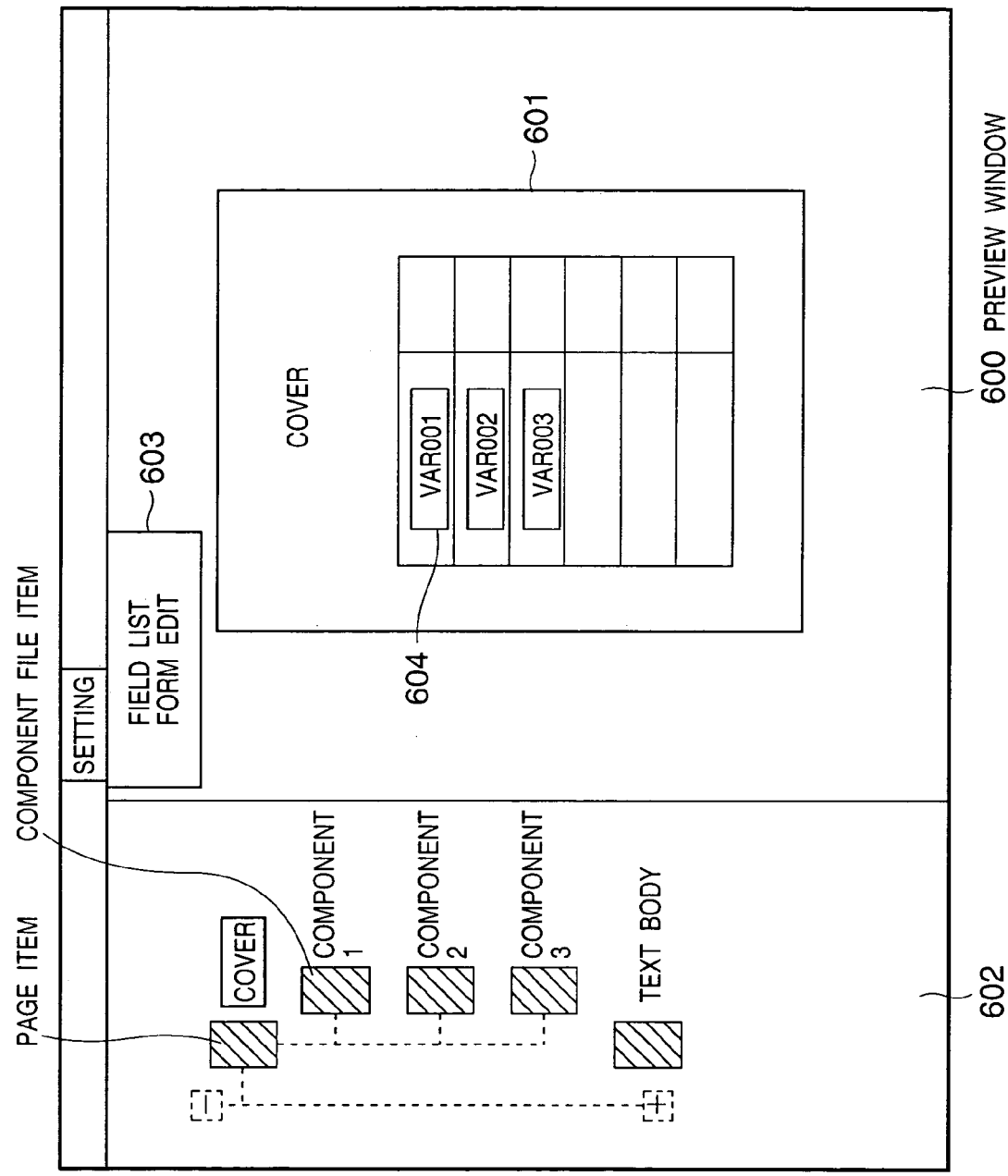
FIG. 12 is a view showing an example of composite form edit window.

When the user selects a composite form column 405, the window shifts to a composite form data edit window shown in FIG. 12. In the composite form data edit window, a composite form data structure serving as an editing target is displayed in a tree display column 602. On the window, the user can edit the form by moving or deleting an object designated on the window with a pointing device, inserting a new object on the window with the pointing device, or changing the name of an object from a keyboard. The user can also edit field attributes and the like. To edit an existing composite form, the user designates the name of this composite form data file to call the form editor. Then, the composite form data is read out from the form data storage 312, and a tree reflecting the structure of these data is displayed.

The image of a page selected in the composite form is displayed in a composite form display column (or preview column) 601. In this case, the displayed image is not always overlaid with component forms in an order defined by the composite form. When an item selected by the tree view is a component form, the page having this component form is displayed in the preview column. For example, the selected component form is displayed in a state discriminated from other component forms. For example, the selected component form and other component forms are displayed in different brightness levels, or the unselected component forms are displayed in a specific color. Since the selected component form is displayed easily discriminated from other component forms, the user can edit the selected component form.

FIG. 12 shows not the form itself but the field edit window. When the user selects "Form Edit" from a menu 603, the window is switched to the form edit window. When the user selects the field edit window in the form edit window, the user can edit the field. In serial numbers 604 of the fields can be displayed in the field edit window. The serial numbers will be described later. Furthermore, when the user selects "Field List" in the menu 603, the list of field attributes is displayed in the order of serial numbers. With these display contents, the user can make the field on the form correspond to its field attributes. This will be described later.

FIG. 13A shows an example of the structure of a composite form data file representing a composite form. Referring to FIG. 13A, composite form data "Test.fcx" is stored in directory "c:ProgramFilesFcproFORMWORK". The contents of the composite form data represent that the value of a page count field 101 is 3, and a total number of printing pages is 3. A page name 102 is the name of the defined printing page, i.e., "Nenkin01". A repetition count represents the repetition count of that page. A page type field 104 represents a standard page, and no two-side or copy is designated. This page is a normal page. The file name field 105 is displayed in a full path, and file name "Nenkin01.fcp" is written at the end of the path. That is, this printing page is found to contain only "Nenkin01.fcp" as the component form.

The next printing page, Nenkin02 (see 106) contains three component forms, "Nenkin02.fcp", "Nenkin03.fcp", and "Nenkin04.fcp". Reference numeral 107 shows the next printing page.

FIG. 13B shows the tree of the composite form data in FIG. 13A. The tree view accurately expresses the contents of the composite form data, and the user can intuitively understand the structure of the composite form data.

Display Sequence of Page

The display sequence of the preview window 600 upon selecting a page and component form in the tree view shown in FIG. 12 will be described with reference to FIGS. 15 to 20.

Figure 15:
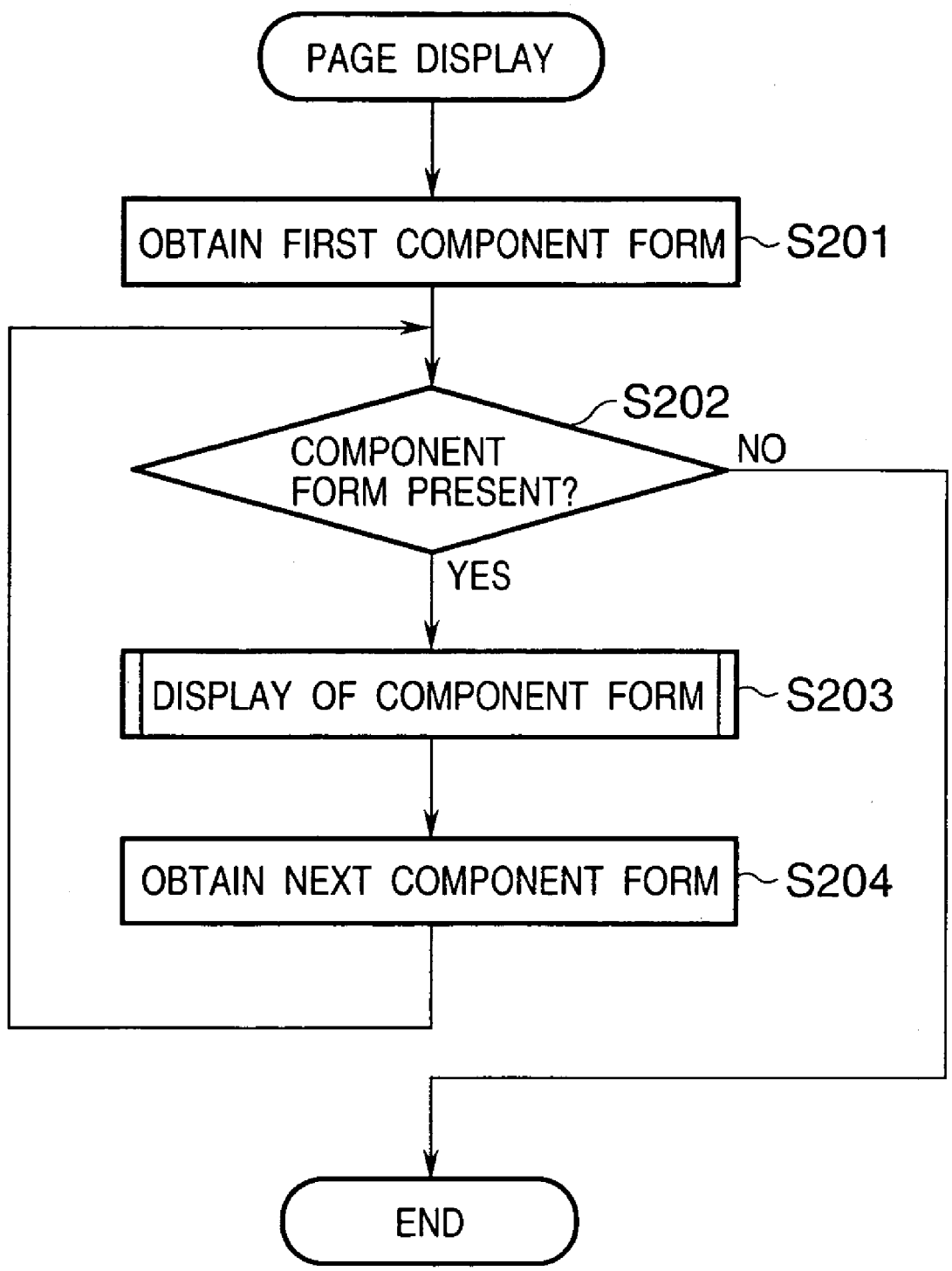
FIG. 15 is a flow chart showing the sequence for displaying a page in a composite form.

Referring to FIG. 15, in a selected page or a page containing a selected component form, the user attempts to obtain the first component form (step S201). It is determined whether the first component form is present (step S202). If YES in step S202, the image of this component form is displayed (step S203). The user then obtains the next component form (step S204), and the flow returns to step S202 to display the page until component forms are absent. The order of component forms can be the arrangement order of the component form files contained in the page, as shown in FIG. 13A.

Figure 16:
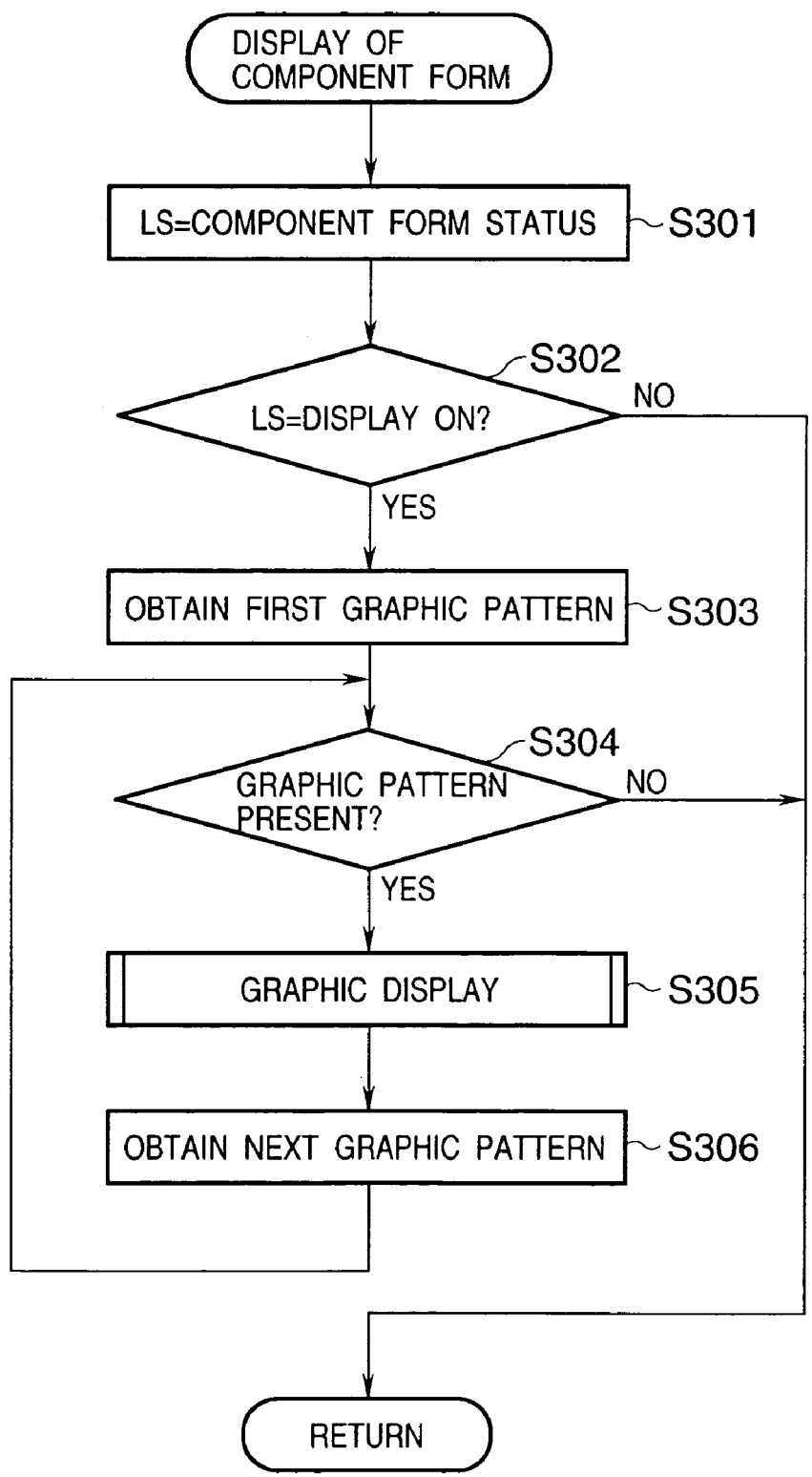
FIG. 16 is a flow chart showing the sequence for a component form display process.

FIG. 16 shows the component form display process in step S203. The status of the component form to be displayed is set in a variable LS (step S301). The component form status includes edit and display statuses, each taking an ON or OFF value.

Next, it is determined whether the LS display status is ON (step S202). If the display status is OFF, the process is ended; otherwise, the first graphic pattern belonging to its layer is obtained (step S303). It is determined whether the graphic pattern is present (step S304). If NO in step S304, the process is ended; otherwise, the graphic pattern is displayed (step S305). When the graphic display process is ended, the next graphic pattern belonging to the same component form is obtained (step S306), and the flow returns to step S304 to perform the graphic display process until the graphic patterns belonging to the same component form are absent.

Figure 17:
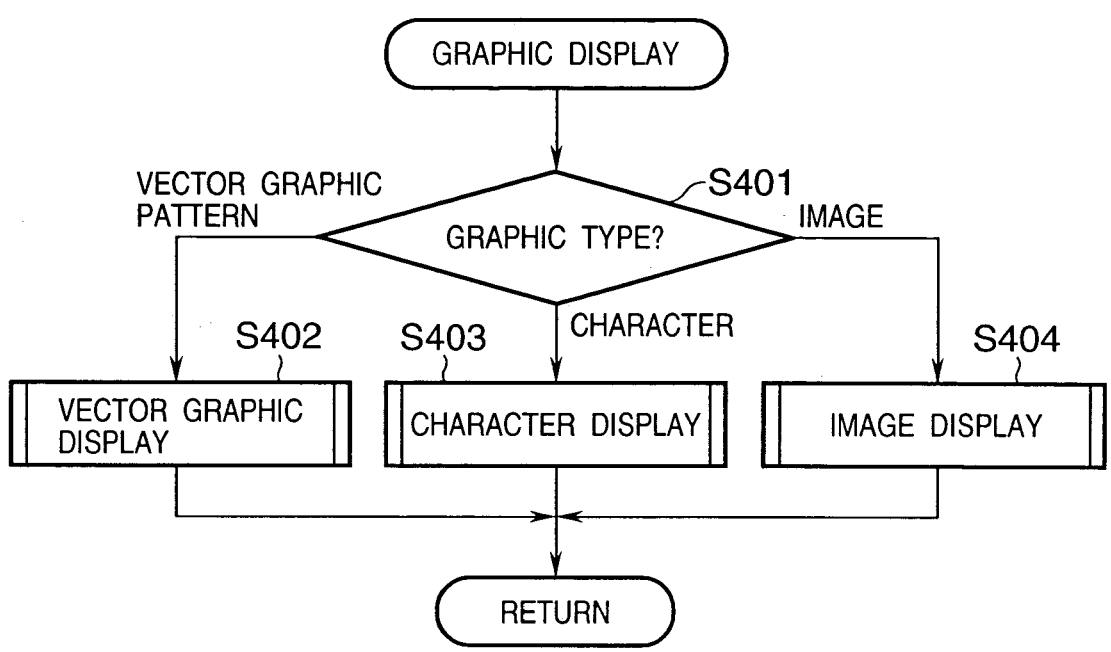
FIG. 17 is a flow chart showing the sequence of a graphic display process.

FIG. 17 shows the graphic display process in step S305. The type of graphic pattern is determined (step S401). If the graphic pattern is a vector graphic pattern, a vector graphic display process is performed (step S403). If the graphic pattern is a character pattern, a character display process is performed (step S402). If the graphic pattern is an image, an image display process is performed (step S404). The process is then ended.

Figure 18:
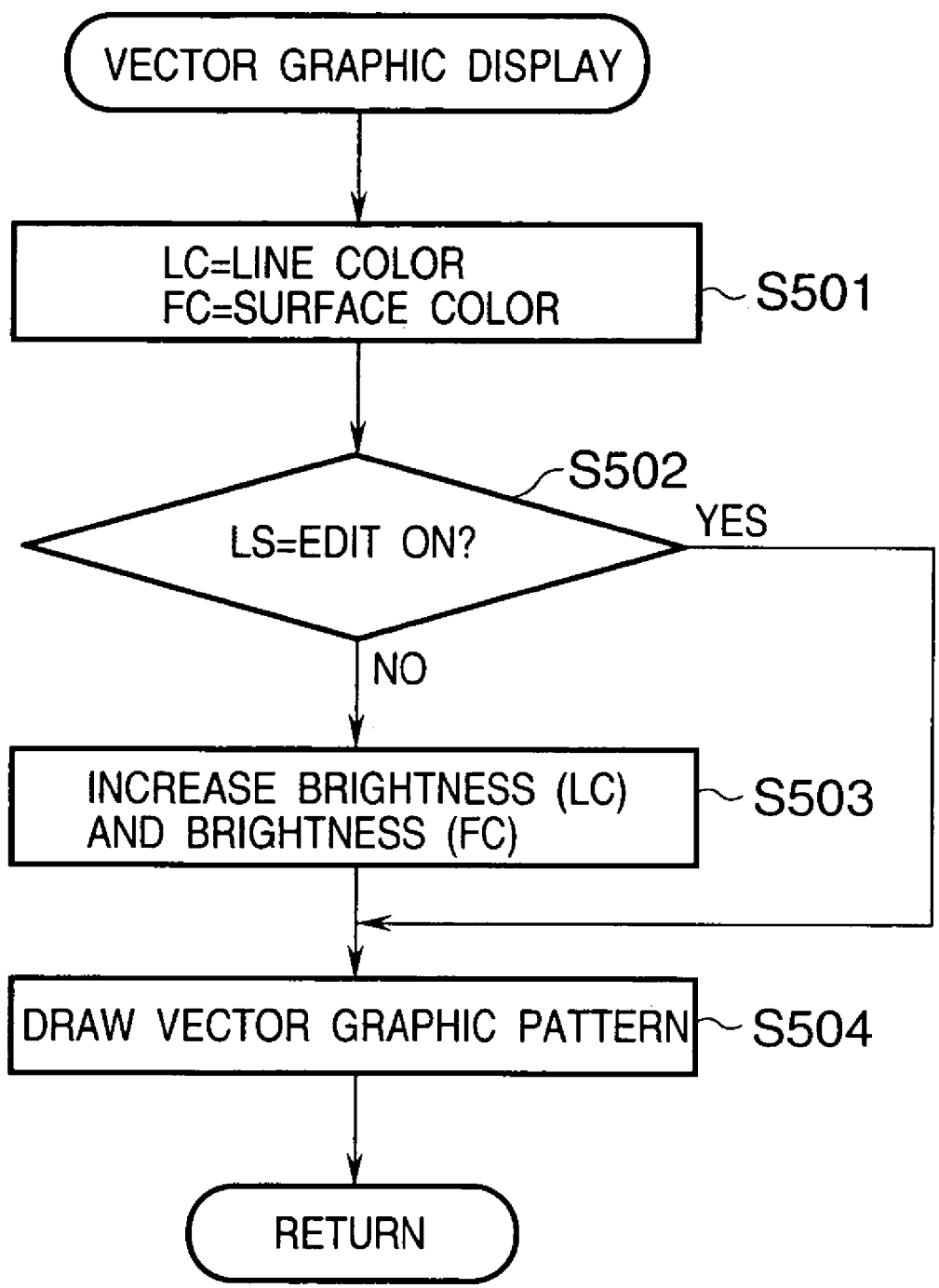
FIG. 18 is a flow chart showing the sequence of a vector graphic display process.

FIG. 18 is the vector graphic display process in step S402. A line color and surface color are obtained and set in variables LC and FC, respectively (step S501). It is determined whether the variable LS represents the ON edit status (step S502). If the edit status is OFF, the brightness values of the colors set in the LC and FC are increased by predetermined values, respectively (step S503). When the brightness values increase, the color becomes weak while the tone of the color is kept unchanged. The vector graphic pattern is drawn using the LC and FC (step S504).

With the above process, the vector graphic pattern belonging to the component form whose display status is OFF is not displayed, but the vector graphic pattern belonging to the component form whose display status is ON and edit status is ON is displayed. The vector graphic pattern belonging to the component form whose display status is ON and edit status is OFF is displayed in a weaker color than usual.

Figure 19:
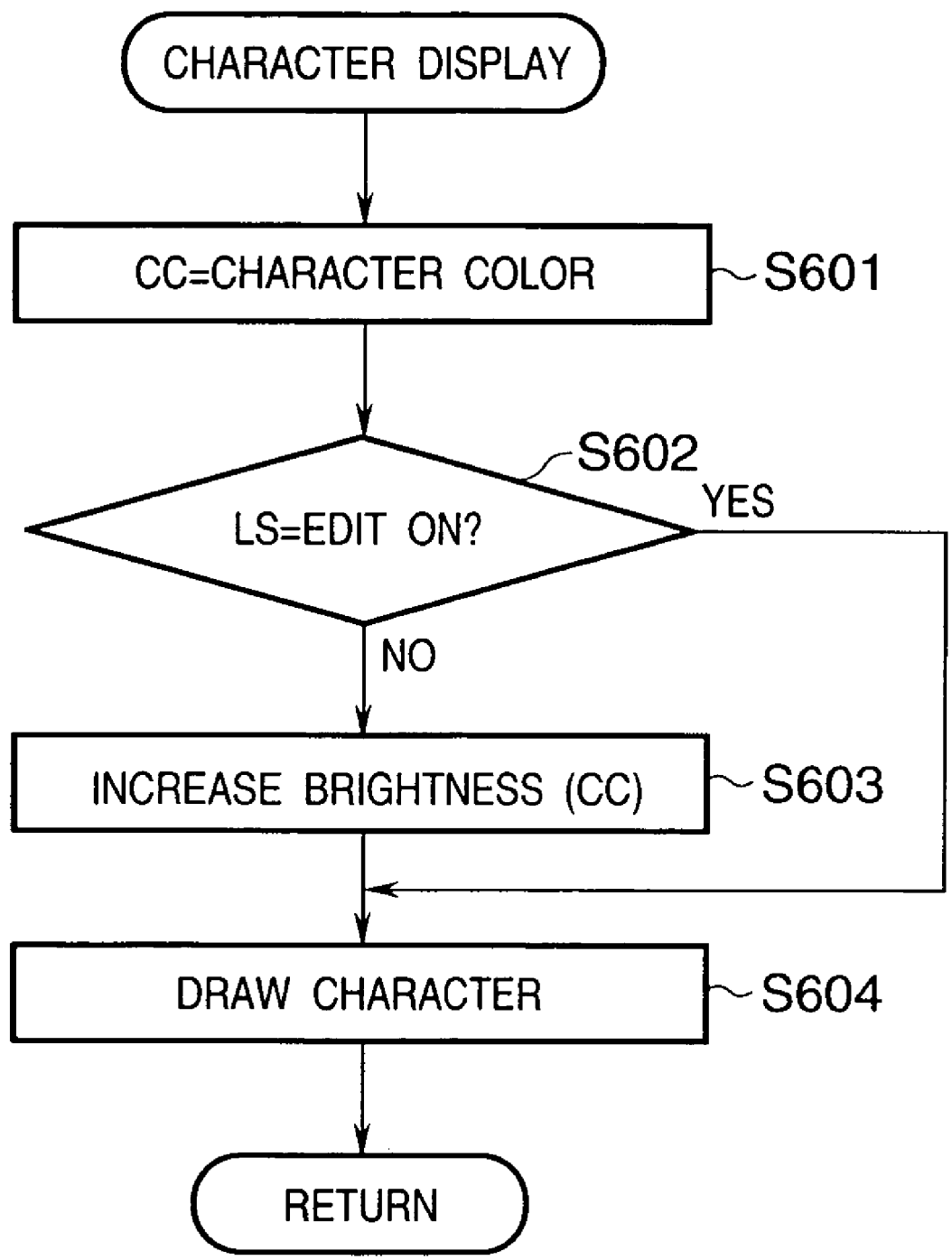
FIG. 19 is a flow chart showing the sequence of a character display process.

Similarly, in the character display process of step S403 in FIG. 19, a character color is obtained and set in a variable CC (step S601). It is determined whether the edit status of the variable LS is ON (step S602). If the edit status is OFF, the brightness of the color of the character, which is set in the CC, is increased by a predetermined value (step S603). The character is drawn using the CC (step S604).

Figure 20:
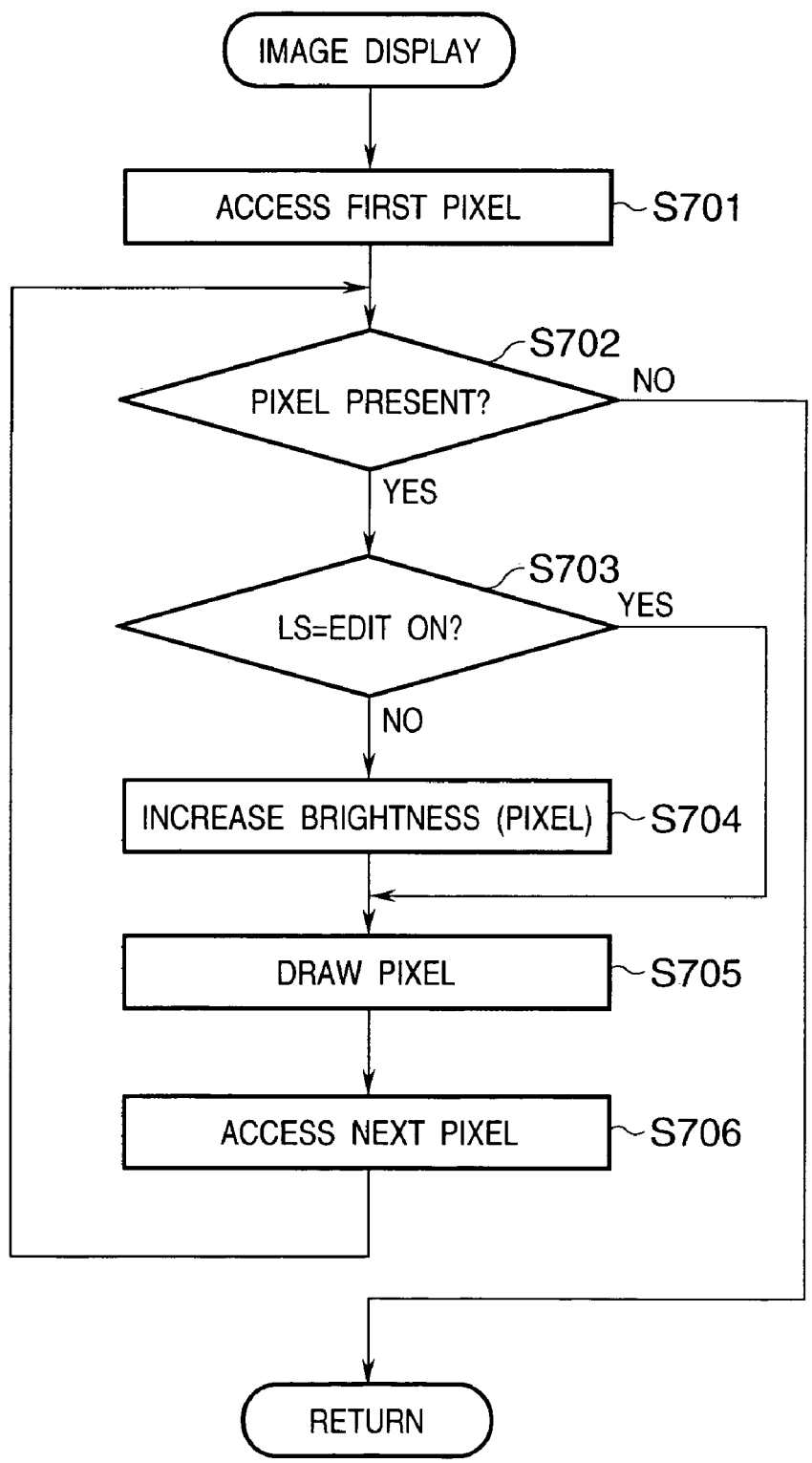
FIG. 20 is a flow chart showing the sequence of an image display process.

Similarly, in the image display process of step S404 in FIG. 20, the first pixel is accessed (step S701) to determine whether the pixel is obtained (step S702). If no pixel is present, the process is ended; otherwise, it is determined whether the edit status of the variable LS is ON (step S703). If the edit status is OFF, the brightness of the pixel is increased by a predetermined value (step S704). The pixel dot is drawn (step S705), and the next pixel is accessed (step S706). The flow then returns to step S702 to continue the pixel drawing process until the pixel is absent.

As described above, the page or component form is selected and displayed. When the component form is selected, the selected component form is displayed in a normal color as an edit target. The unselected component form contained in the same page as that of the selected component form can be displayed weak. When the component form is not selected, all the component forms contained in the designated page can be normally displayed. When the selected component form is stored in an edit buffer and the edit function is set usable, the user can edit the designated component form while watching the image on the entire page.

Description of Field Data

Figure 2:
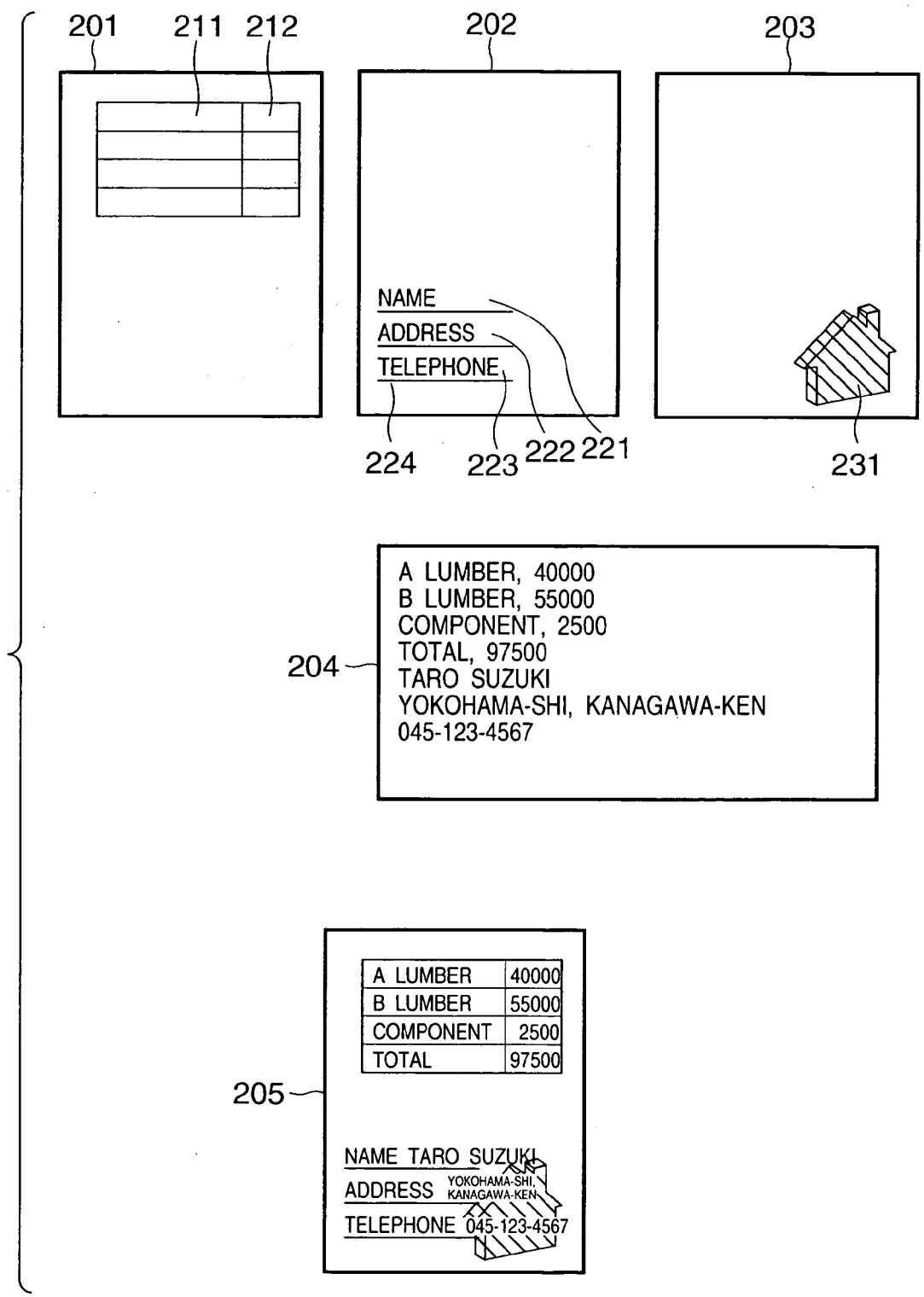
FIG. 2 is a conceptual view showing document creation using a plurality of component forms.

FIG. 2 is a view showing an example of creating a document using composite form information. Each document is made up of a form information file (composite form data file) and field data file. The form information file relates component forms with each other. The component forms and field data substantially construct the document. Component forms 201, 202, and 203 are related to the same page. Field data 204 is overlaid on the form information to form a document 205. In general, the field data is delimited by commas or line return characters. Any data can be used as field data if it has a structure for delimiting the data. This embodiment assumes a document browsing/printing system for creating a document as described above.

After the method of creating a document in the above system is described, a form list in the composite form editor for relating a plurality of component forms with each other and defining a document will be described below. A form editor (not shown) creates each component form file, and a data creation application (not shown) creates a field data file. Three elements, i.e., graphic information, fixed character information, and field information constructing form information are exemplified as follows. An image 231 and ruled lines drawn in a form 201 construct the graphic information. A character string 224 constructs the fixed character information. The field information is defined to fill tables 211 and 212 or defined at positions for filling items 221, 222, and 223.

Figure 3:
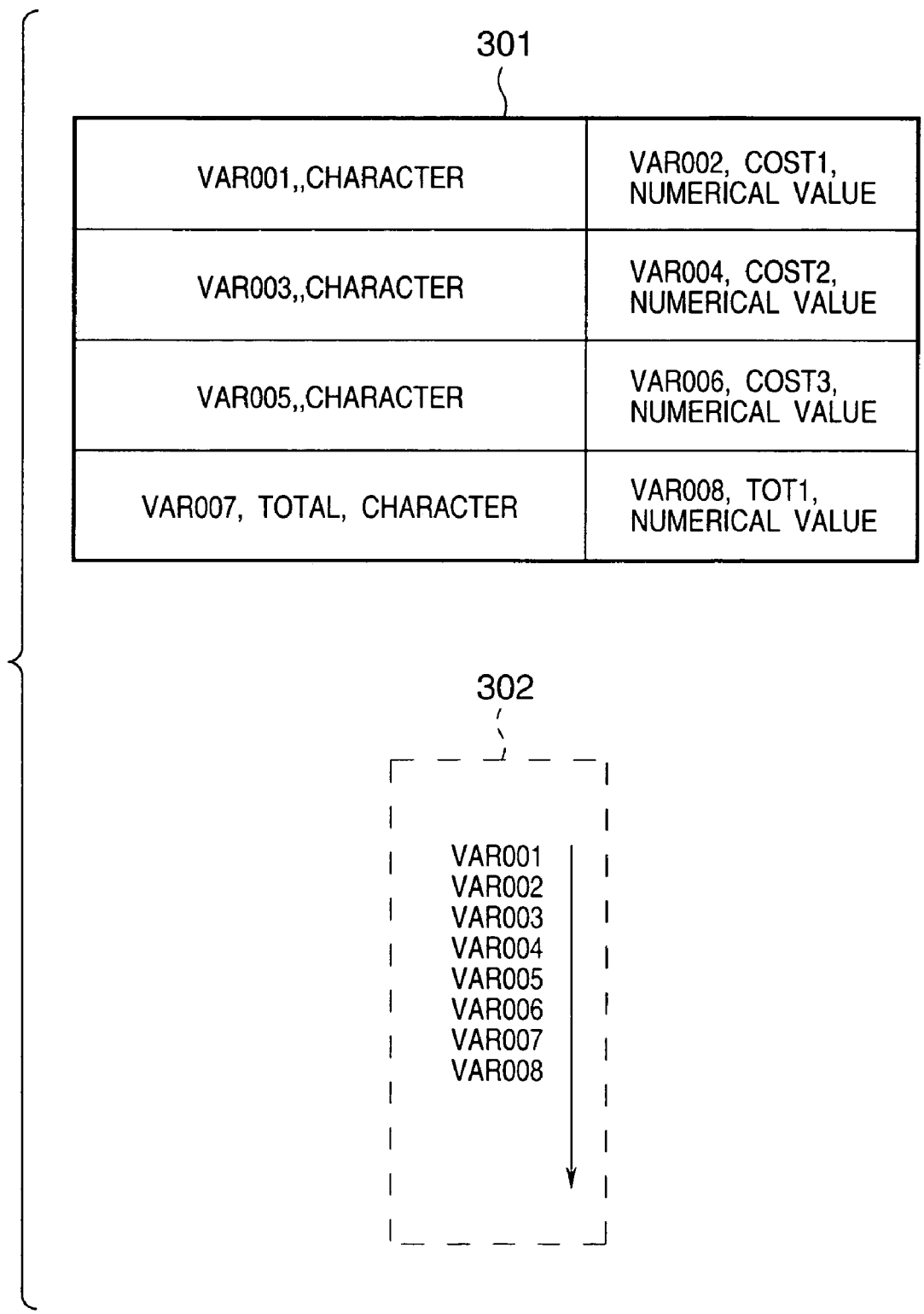
FIG. 3 is a conceptual view showing field information.

Referring to FIG. 3, the defined state of the field information will be described below. A table 301 is extracted from the component form 201 in FIG. 2. Eight fields from field number VAR001 to field number VAR008 are defined to fill the columns of the table. Field names COST1 and COST2 are assigned to the field numbers VAR002 and VAR004, respectively, but the field numbers VAR001 and VAR003 have no field names. A field number uniquely determined in each component form is used as the field name for fields having no field names. The data are filled in the fields in ascending order of serial numbers. As indicated by a frame 302, the data are filled in the order of VAR001 and VAR002 in accordance with the serial numbers.

Figure 4:
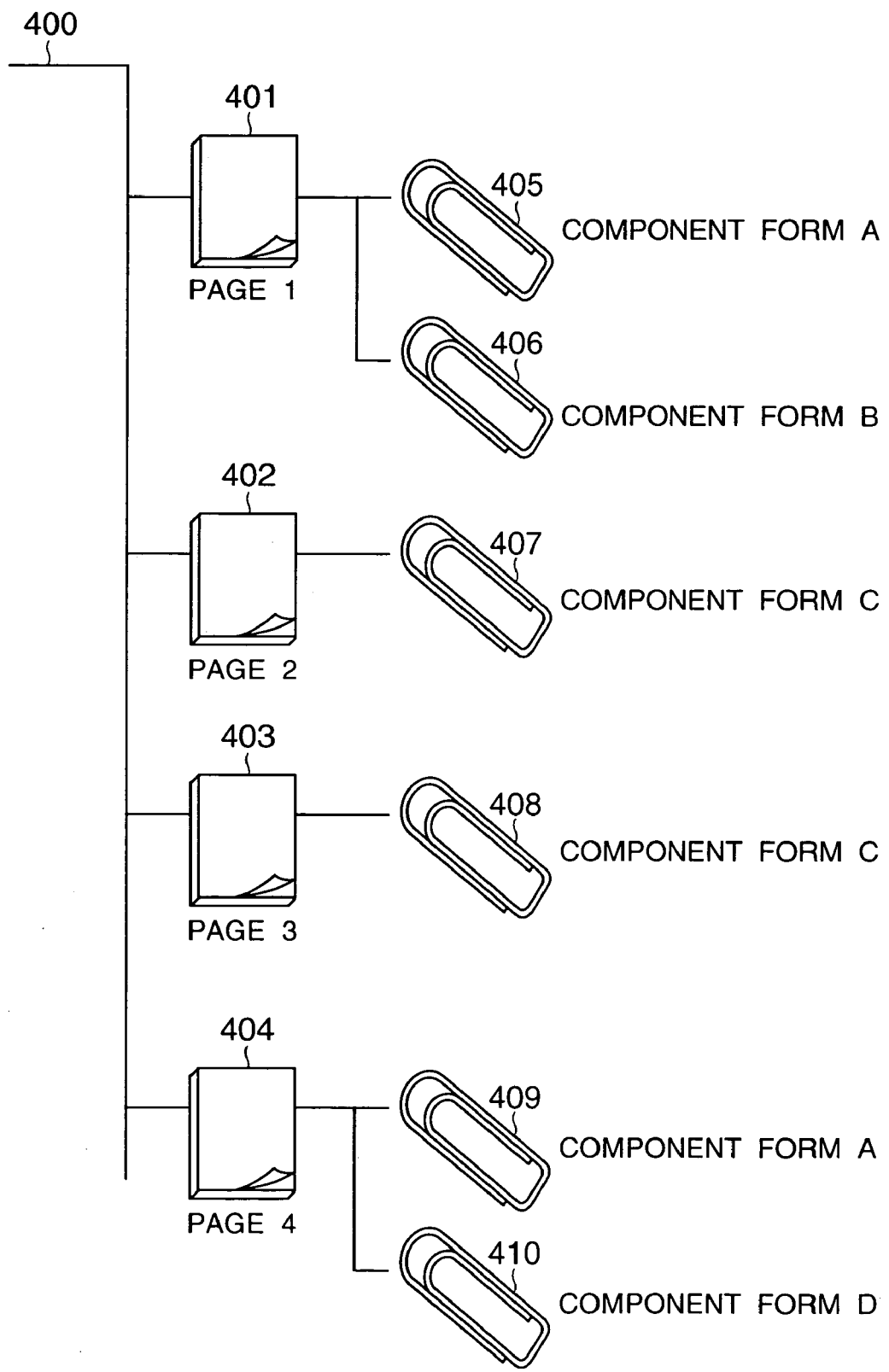
FIG. 4 is a view showing the relationship between the component forms and pages of a document.

FIG. 4 is a view for explaining the function of defining a document by relating a plurality of component forms of the composite form editor with each other. FIG. 4 apparently indicates that each page constructing a document are related to one or a plurality component form files. Component forms A 405 and B 406 are related to page 1 (401), while only a component form C 407 is related to page 2 (402). The component form A is shared by pages 1 (401) and 4 (404), but the second form uses component forms B 406 and D 410.

Page 2 (402) and page 3 (403) are related to the same component form C, but data filled in the fields of the respective component forms are not identical. The data recorded in the field data file are filled in the fields from the beginning in a predetermined order of pages in a composite form, component forms in each page, or serial numbers in each component form. The orders of pages and component forms are the same as the order of component form data shown in FIG. 13A.

As described above, component forms are filled in the fields from the upper component form in FIG. 4. More specifically, the data are filled in all the fields of the component form A 405 in the order of serial numbers, and then the data are filled in the fields of the component form B 406. Similarly, the field data file is read such that the data are filled in the fields defined in the component form C of page 2, and then in the component C of page 3.

Field List

Figure 5:
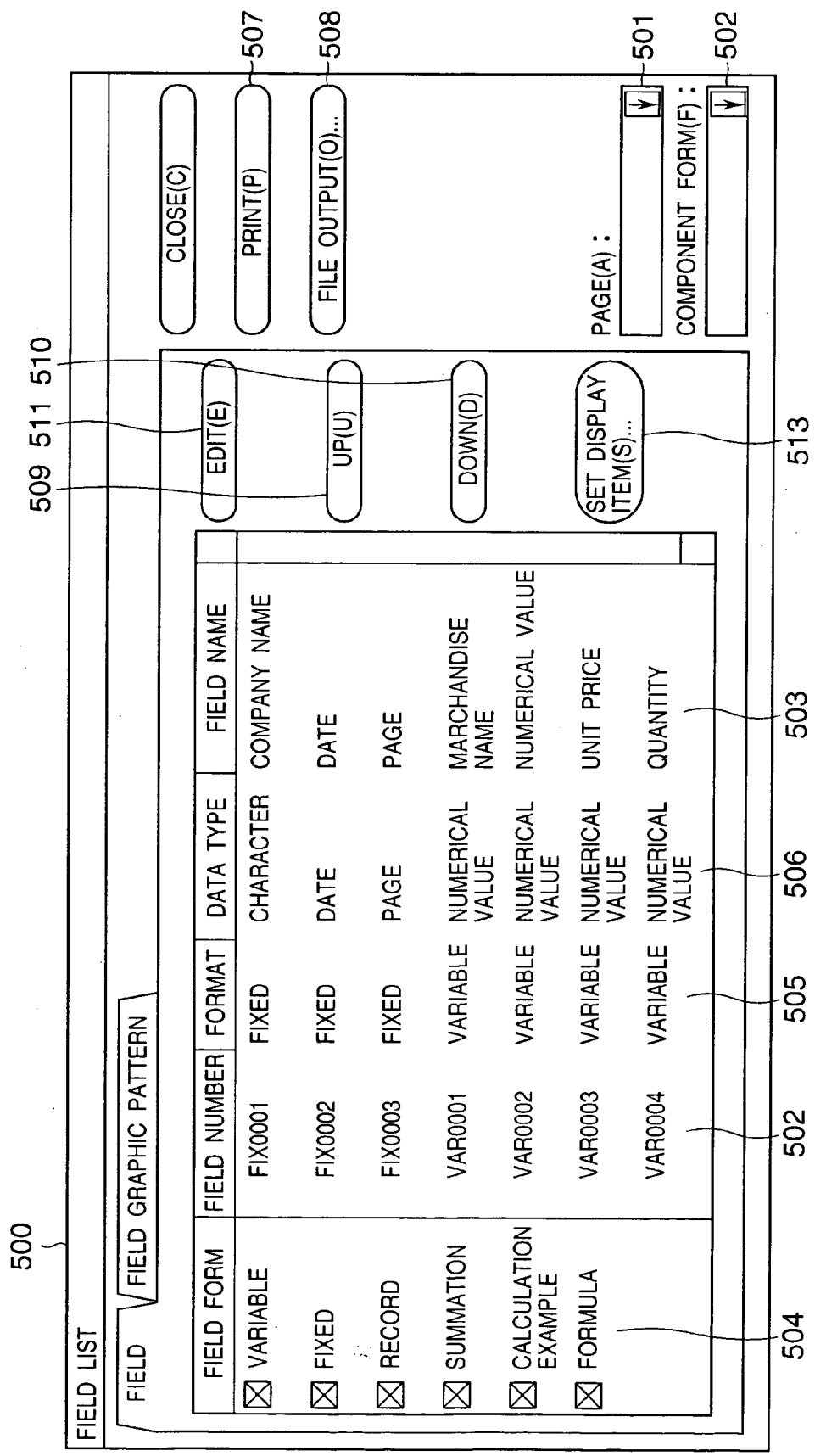
FIG. 5 is a view showing a field list.

FIG. 5 shows a displayed field list. The field list is displayed using an arbitrary area in an application such as a composite form editor. A display example on the operating system based on the window system is a field list 500. A list of fields having all component forms related to the page designated by a designated page column 501 is displayed.

A field number 502 is a number uniquely determined in the designated page. The field numbers are serial numbers exceeding the boundary between the component forms. In this embodiment, the field numbers are directly used as the serial numbers. The field number increments even if the component form is switched to another component form. Even if the fields in the field numbers VAR003 and VAR004 are defined in different component forms, the user can grasp the field list without being conscious of the difference. The field number is assigned from VAR001 in creating each component form. In the field list, however, the field numbers are reassigned so that they can be used as the serial numbers in the page.

A field name 503 represents a field name just defined. A field format 504 represents the type of usable field. Different data formats are assigned in units of field formats. The data formats are indicated in units of type columns 505 in the field list. In this embodiment, the field formats to be displayed are designated using check boxes. FIG. 5 shows a state that all the field formats are designated using the check boxes. Data types 506 are assigned and displayed as attributes independently of the field formats.

In addition to the display of the field list using the window 500, the field list can be printed or output as a file by a command designated by pressing a print button 507 or file output button 508. In any case, the order of fields is distinguished using line numbers, ruled lines, and the like so as to allow the user to use the field data for verification or the like.

In the field list display of this embodiment, an up button 509 and a down button 510 are arranged to change the order of the fields. The order of the immediately upper or lower fields can be changed within only the same component form. An edit button 511 is used to correct a field attribute, format and a field name or delete a characteristic field. When the user operates this edit button 511, the field edit window shown in FIG. 12 is displayed to allow the user to edit the field attributes. At this time, a field selected in the field list is kept selected even on the field edit window, and the user can immediately edit this field.

The window also has a button 513 for calling a function for designating items listed in the list display and a button 512 for switching a display method of displaying each component form.

When the designated page referred to for the page column 501, and the like, is changed, the field list is also updated to display the field list defined in the newly designated page.

When the user adds, deletes, or updates a component form file on the composite form editor, the field list is updated and displayed if it is related to the page displayed by the operated component form.

Display Process of Field List

Figure 1:
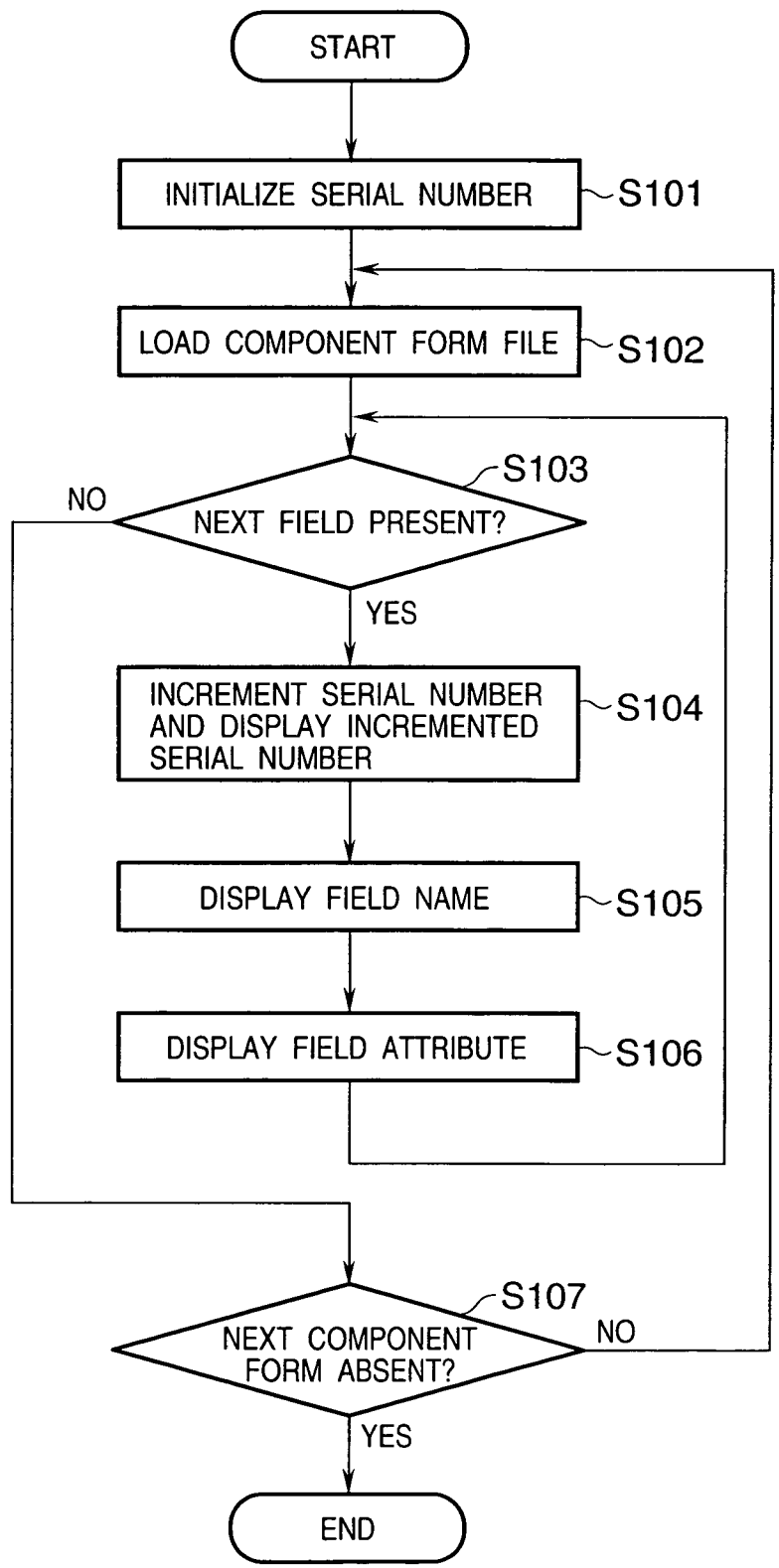
FIG. 1 is a flow chart showing a processing flow for creating a form list.

FIG. 1 is a flow chart of a process for creating a field list from field attribute data contained in each component form related to the selected page, and displaying the created field list. The flow chart in FIG. 1 is executed every time a field list output is designated, or the component form itself related to a composite form loaded by the composite form editor or the relationship between the component forms is updated.

That is, the flow chart is executed when "add", "delete", or "move" operation is performed in the component form or the component form itself is updated.

A variable representing the serial number is initialized (S101). The first component form file in the order is loaded (S102). A search is made in the loaded component form to determine whether the next field is present (S103). If YES in step S103, the serial number is incremented by one for each field format, and the incremented serial number is displayed (S104). A field name is displayed on the right of the incremented serial number (S105), and other field attributes (S106) such as the position, number, font, and color of characters assigned to the field (S108) are displayed on the right of the field name.

When the next field is defined in the same component form, the serial number is similarly incremented, and the incremented serial number is displayed. After all the field information in this component form is displayed, it is determined whether the next component form file is present (S107). If YES in step S107, this file is loaded (S102), and the same processing as described above is repeated. The field information of all the related component forms is displayed, and the display of the field list is complete.

The field list is displayed every time the field is loaded in FIG. 1, but the field list may be stored in a memory, and the final field list may be displayed.

As described above, the field list is output, and all the fields defined in the component forms related to the selected one page can be displayed in a list in the loading order of the field data. The operator can easily know the order of data of the field data files. The fields of each page can be easily collated with field data in creating or verifying the field data, thereby reducing the load on the operator and improving the productivity.

Shift to Field Editing

Figure 14:
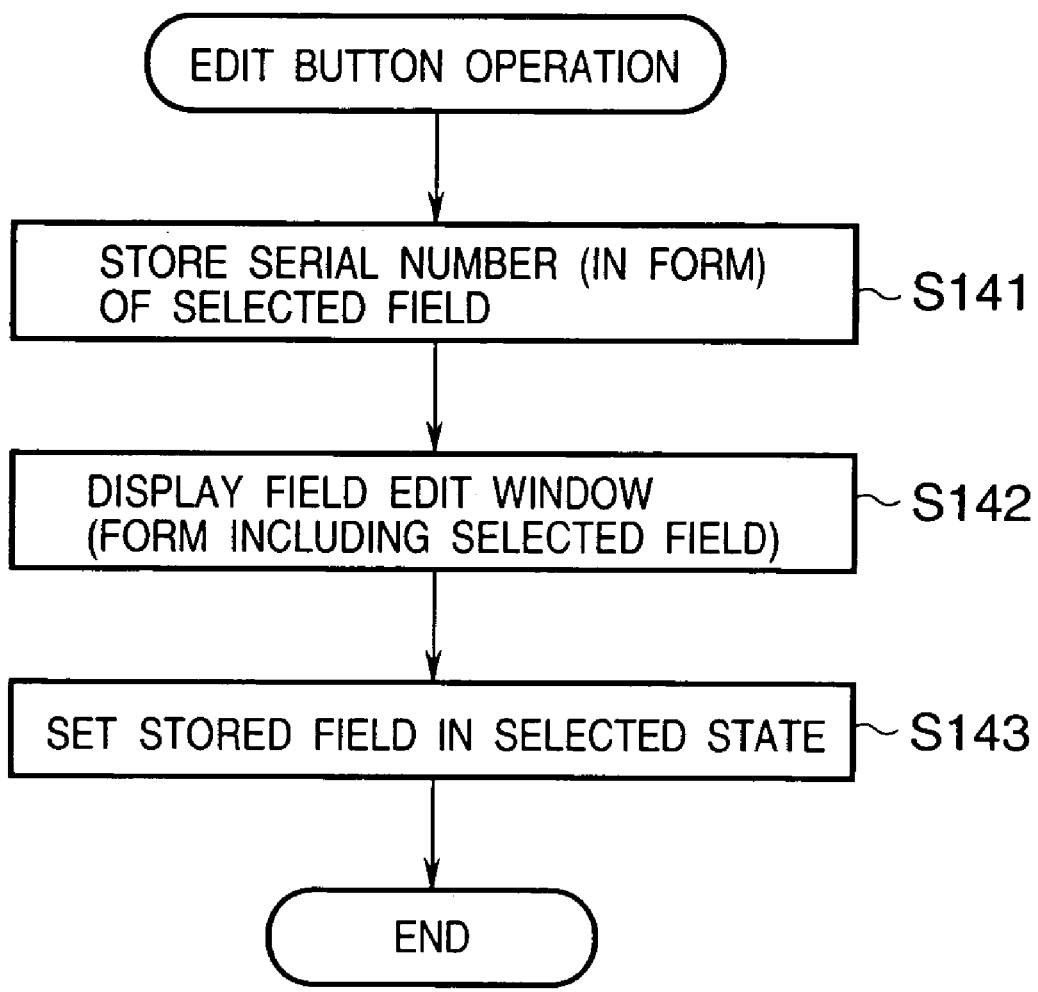
FIG. 14 is a flow chart showing the sequence for shifting a field list to field editing.

FIG. 14 is a flow chart showing the sequence when the edit button 511 in FIG. 5 is operated. The serial numbers of the fields selected by the user in the component form from the field list are stored (step S141). If no field is selected, a value representing this is stored. The field edit window shown in FIG. 12 is displayed for, if any, the selected fields of the designated page such that the component forms containing the selected fields can be edited (step S142). If no field is selected, the designated page is displayed in the order that the component forms contained in the designated page are defined. Finally, the fields stored in step S141 are kept selected (step S143). That is, the window shifts to the field edit window so that the selected fields can be immediately edited. The stored fields are displayed as the selected fields on the display. For example, the selected fields are displayed in an inverted state or frame. To display a specific component form in an editable state, the specific component form is displayed in a color or brightness different from those of other component forms or in the most foreground layer as explained in FIGS. 15 to 20. With this arrangement, when only the selected component form is stored in an edit buffer memory, the user can edit the selected component form. Note that fields in the field list are selected with a keyboard or pointing device.

Since the field selected in the field list is kept in a selected state according to the above sequence, the user can immediately perform editing such as a change in attribute of the selected field.

Composite Form Editor Arrangement as Computer Product

Figure 6:
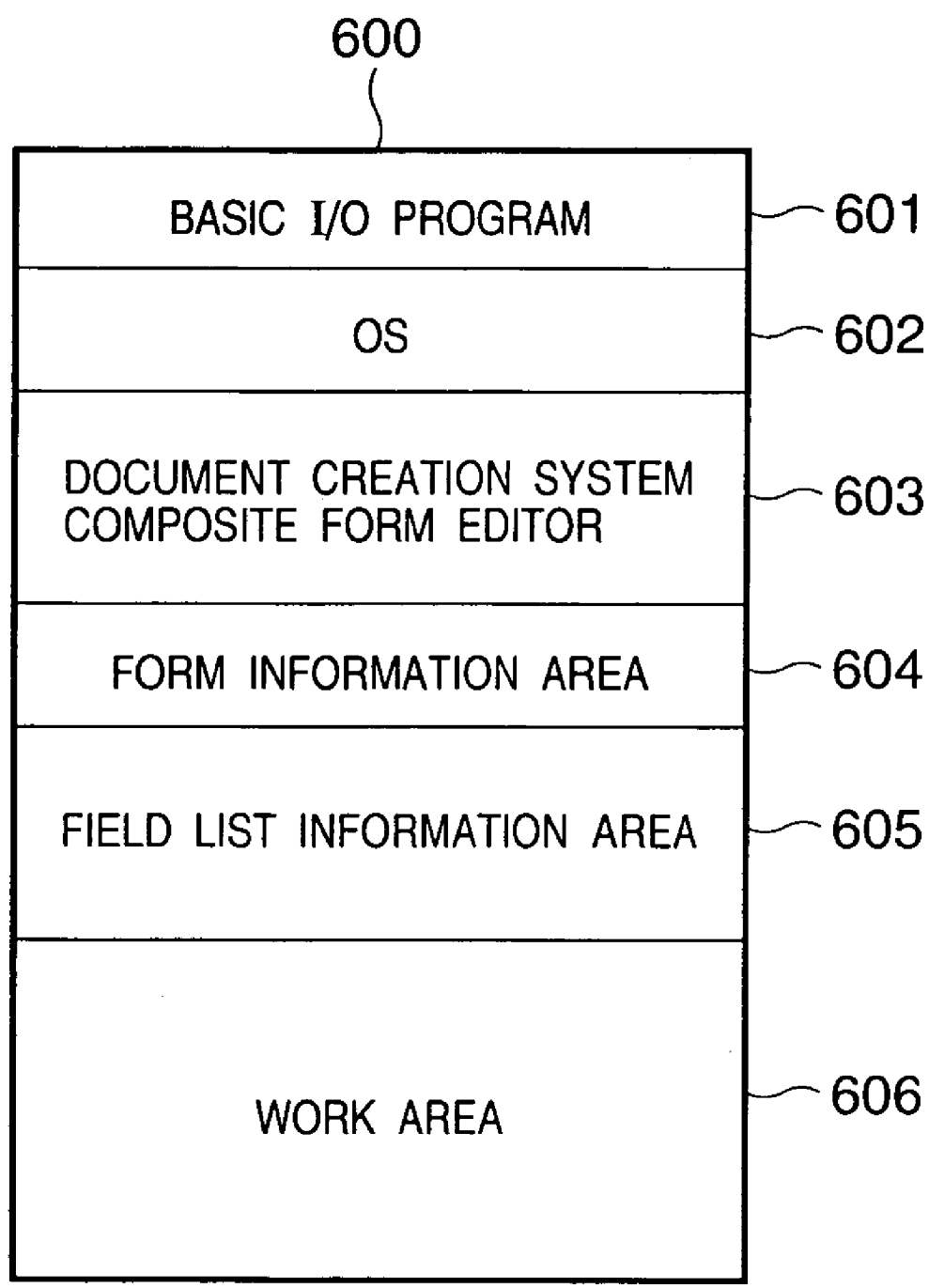
FIG. 6 is a view showing a memory map when a composite form editor is installed in a computer.

The composite form editor of this embodiment is installed in the computer, as shown in a memory map 600 in FIG. 6 and operates as part of a document creation system not particularly described or as a single application 603. A basic I/O program 601 and OS 602 are installed in the memory. A memory area is assured for form information 604 and field list 605. Temporary processes are performed using a remaining work area 606.

An FD 807 in FIG. 8 stores the composite form editor program implementing a composite form editing method to be described in this embodiment, and data related to this program. The contents of the floppy disk are loaded to the computer to implement the composite form editor of this embodiment. The contents of the floppy disk are shown in FIG. 7.

Figure 7:
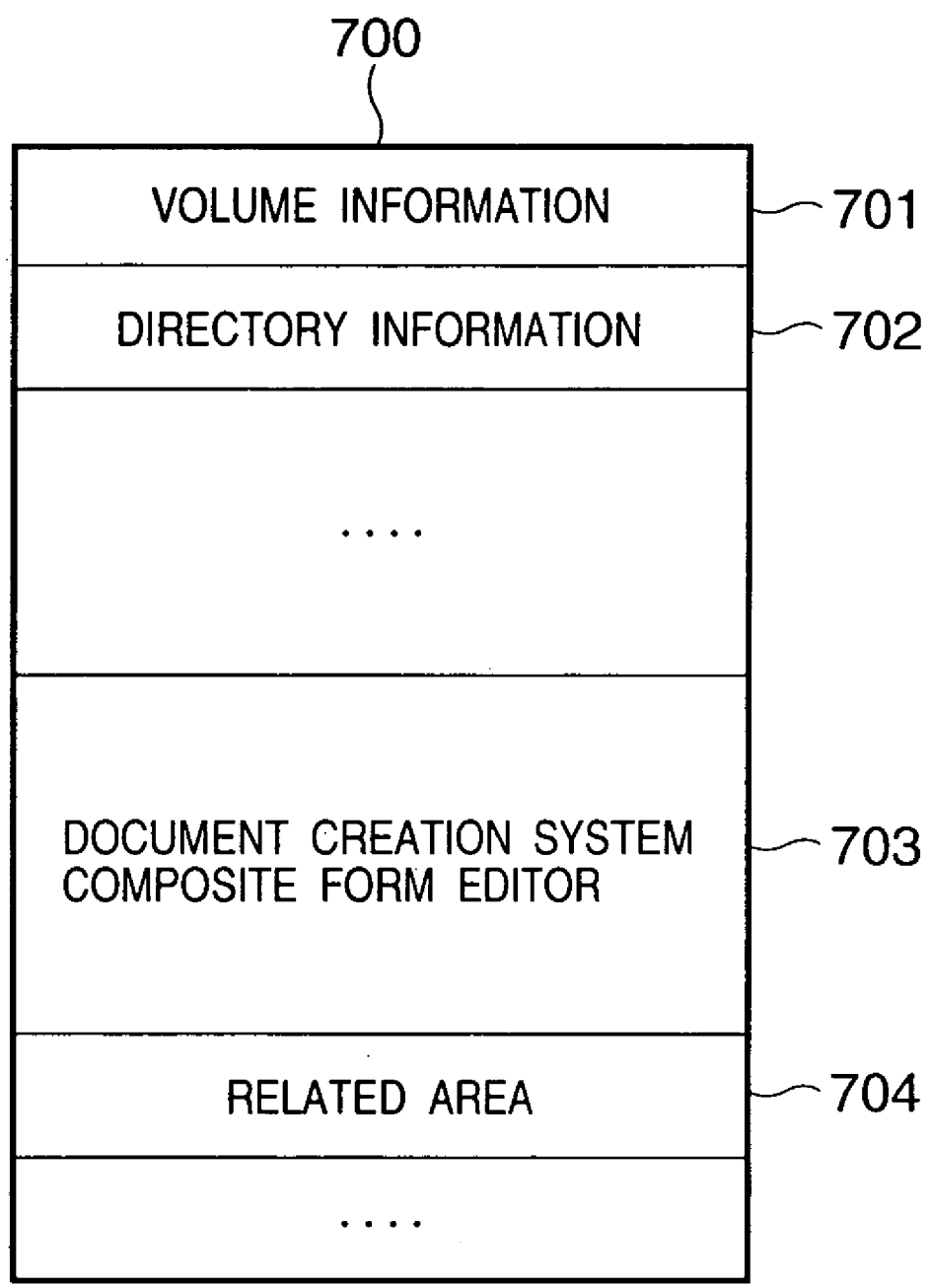
FIG. 7 is a view showing an allocation map showing the layout of data in a floppy disk.

Referring to FIG. 7, volume information 701 represents FD information. Directory information 702 represents a file layout. The composite form editor program 703 to be described in this embodiment is recorded as a single application or part of a document creation system. The composite form editor uses related data 704. These program and data are stored in the FD in FIG. 6. However, the same description will be made even if the program and data are stored in another storage medium such as an HD, CD-ROM, or ROM chip.

Figure 9:
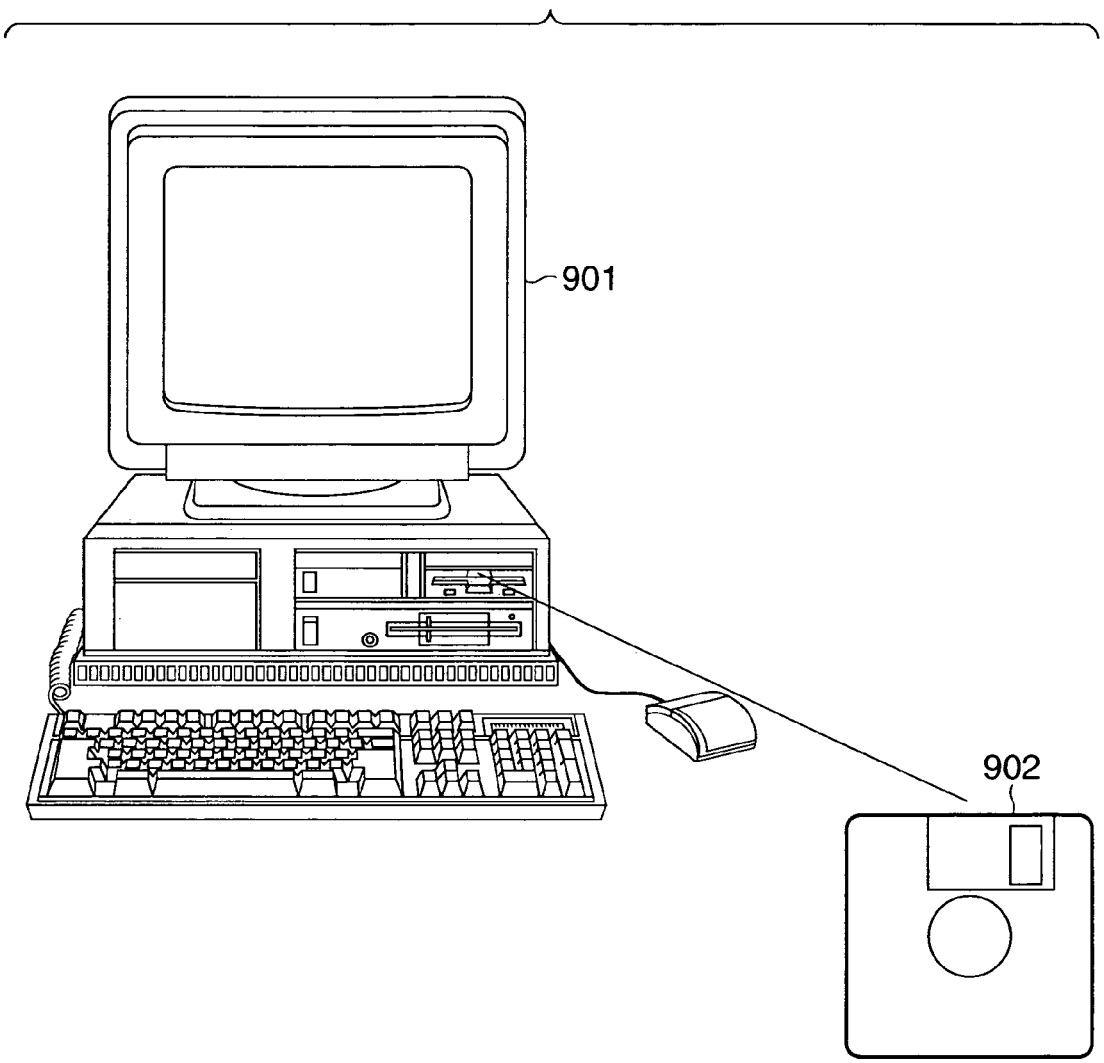
FIG. 9 is a view showing the relationship between the computer and the floppy disk.

FIG. 9 shows the relationship between the FD and computer. Referring to FIG. 9, the data in an FD 902 is loaded to a computer 901 to allow registering and executing the composite form editor having the field definition scheme described in this embodiment.

The data loading order is indicated by the serial number 501 displayed in FIG. 5 of this embodiment. However, the data loading order may be displayed by the number of lines in the field data file, or numeric values or symbols having a detailed meaning such as an input position index in an arbitrary field data file creation application (not shown) in the field list.

As has been described above, the operator can easily know the order of data of the field data files by displaying all the fields defined in the component forms related to one page in the field data loading order. Thus, the load on the operator can be reduced, and productivity can be improved.

Even if the definitions of the fields are changed upon editing component forms, a correct field list can be provided.

A field selected from the items of the field list can be easily edited.

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

As many apparently widely different embodiments of the present invention can be made without departing from the spirit and scope thereof, it is to be understood that the invention is not limited to the specific embodiments thereof except as defined in the appended claims.

What is claimed is:

1. A form editing method of editing composite form template data to be synthesized with field data, the composite form template data being obtained as a combination of component form template data, said method comprising the steps of:

a component form template data generation step, of generating component form template data including a plurality of field attribute data, each field attribute data defining an attribute of the field data, wherein a page of the composite form template data comprises a plurality of component form template data;

a form data storing step, of storing composite form template data in a form data storage means, the composite form template data containing a plurality of the component form template data generated in said component form template data generation step in a predetermined order in one page; and a field list display step, of displaying each field attribute data of the plurality of component form template data, which is contained in a page of interest of the composite form template data stored in the form data storage means, with each serial number as a list;

wherein the component form template data defines a field order of the plurality of field attribute data contained in the component form template data; and wherein said field list display step further comprises the steps of:

(a) loading, as component form template data of interest, one of the component form template data contained in the composite form template data of one page in the predetermined order;

(b) incrementing the serial number in accordance with the field order of the field attribute data contained in the component form template data of interest loaded in the step (a); and (c) displaying the field attribute data contained in the component form template data of interest and the serial number incremented in step (b).

2. The method according to claim 1, wherein attributes of the fields uniquely ordered in the page of interest are displayed as a list uniquely corresponding to the unique order in the page of interest.

3. The method according to claim 2, wherein, when a component form contained in the list is edited during display of the list, the fields in the page of interest are reordered on the basis of the edited component form, and the list is displayed again.

4. The method according to claim 2, wherein, when a desired field is selected from the list and an attribute of the selected field is designated, a component form having the selected field is displayed as an editing target.

5. The method according to claim 4, wherein other component forms contained in the page of interest are displayed to be distinguishable from the component form containing the selected field.

6. A form editing apparatus for editing composite form template data to be synthesized with field data, the composite form template data being obtained as a combination of component form template data, said apparatus comprising:

component form template data generation means for generating component form template data including a plurality of field attribute data, each field attribute data defining an attribute of the field data, wherein a page of the composite form template data comprises a plurality of component form template data;

form data storage means for storing the composite form template data, the composite form template data containing a plurality of the component form template data generated by said component form template data generation means in a predetermined order in one page; and field list display means for displaying each field attribute data of the plurality of component form template data, which is contained in a page of interest of the composite form template data stored in said form data storage means, with each serial number as a list;

wherein the component form template data defines a field order of the plurality of field attribute data contained in the component form template data; and wherein said field list display means further comprises:

loading means for loading, as component form template data of interest, one of the component form template data contained in the composite form template data of one page in the predetermined order;

incrementing means for incrementing the serial number in accordance with the field order of the field attribute data contained in the component form template data of interest loaded by the loading means; and display means for displaying the field attribute data contained in the component form template data of interest and the serial number incremented by the incrementing means.

7. The apparatus according to claim 6, wherein attributes of the fields uniquely ordered in the page of interest are displayed as a list uniquely corresponding to the unique order in the page of interest.

8. The apparatus according to claim 7, wherein, when a component form contained in the list is edited during display of the list, the fields in the page of interest are reordered on the basis of the edited component form, and the list is displayed again.

9. The apparatus according to claim 7, wherein, when a desired field is selected from the list and an attribute of the selected field is designated, a component form having the selected field is displayed as an editing target.

10. The apparatus according to claim 9, wherein other component forms contained in the page of interest are displayed to be distinguishable from the component form containing the selected field.

11. A computer program product loadable to a computer memory, comprising program codes for executing the following steps:

a component form template data generation step, of generating component form template data including a plurality of field attribute data, each field attribute data defining an attribute of the field data, wherein a page of composite form template data comprises a plurality of component form template data;

a form data storing step, of storing composite form template data in a form data storage means, the composite form template data containing a plurality of the component form template data generated in said component form template data generation step in a predetermined order in one page; and a field list display step, of displaying each field attribute data of the plurality of component form template data, which is contained in a page of interest of the composite form template data stored in the form data storage means, with each serial number as a list;

wherein the component form template data defines a field order of the plurality of field attribute data contained in the component form template data; and wherein said field list display step further comprises the steps of:

(a) loading, as component form template data of interest, one of the component form template data contained in a composite form template data of one page in the predetermined order;

(b) incrementing the serial number in accordance with the field order of the field attribute data contained in the component form template data of interest loaded in the step (a); and (c) displaying a field attribute data contained in the component form template data of interest and the serial number incremented in step (b).

12. The product according to claim 11, wherein attributes of the fields uniquely ordered in the page of interest are displayed as a list uniquely corresponding to the unique order in the page of interest.

13. The product according to claim 12, wherein, when a component form contained in the list is edited during display of the list, the fields in the page of interest are reordered on the basis of the edited component form, and the list is displayed again.

14. The product according to claim 12, wherein, when a desired field is selected from the list and an attribute of the selected field is designated, a component form having the selected field is displayed as an editing target.

15. The product according to claim 14, wherein other component forms contained in the page of interest are displayed to be distinguishable from the component form containing the selected field.

16. A computer-readable storage medium storing the computer program product defined in claim 11.

* * * * *

UNITED STATES PATENT AND TRADEMARK OFFICE
CERTIFICATE OF CORRECTION

PATENT NO. : 6,959,414 B1
DATED : October 25, 2005
INVENTOR(S) : Takuya Kakehashi It is certified that error appears in the above-identified patent and that said Letters Patent is hereby corrected as shown below:

Column 12,
Lines 11 and 67, "list;" should read -- list, --.
Line 14, "data;" should read -- data, --.

Column 13,
Line 3, "data;" should read -- data, --.

Column 14,
Line 8, "list;" should read -- list, --.
Line 11, "data;" should read -- data, --.

Signed and Sealed this

Twenty-first Day of March, 2006

JON W. DUDAS
*Director of the United States Patent and Trademark Office*